C. H. CLARK & H. L. BEACH.
DUMP TRUCK.
APPLICATION FILED FEB. 27, 1915.
1,220,727.
Patented Mar. 27, 1917.
2 SHEETS—SHEET 2.
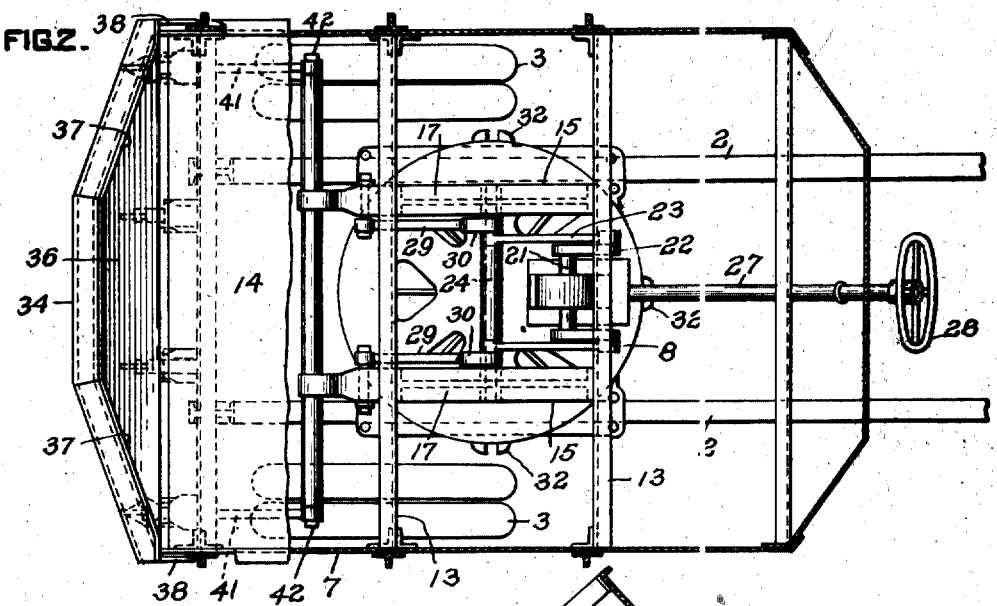
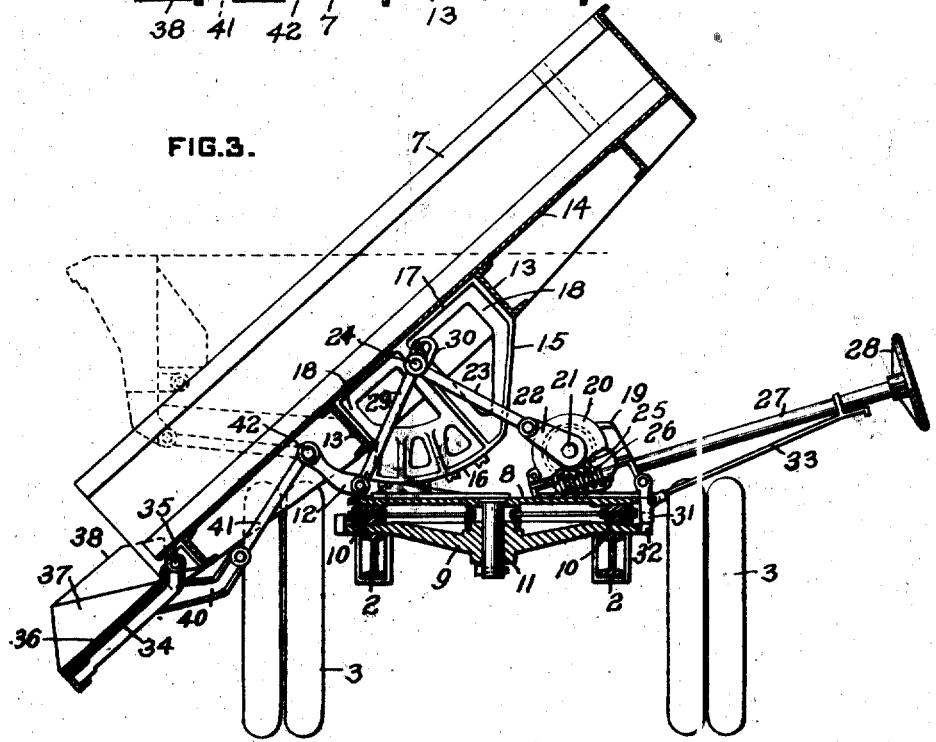
WITNESSES
J. Herbert Bradley.
Ella M. Connell
INVENTORS
Chas. H. Clark
Howard L. Beach

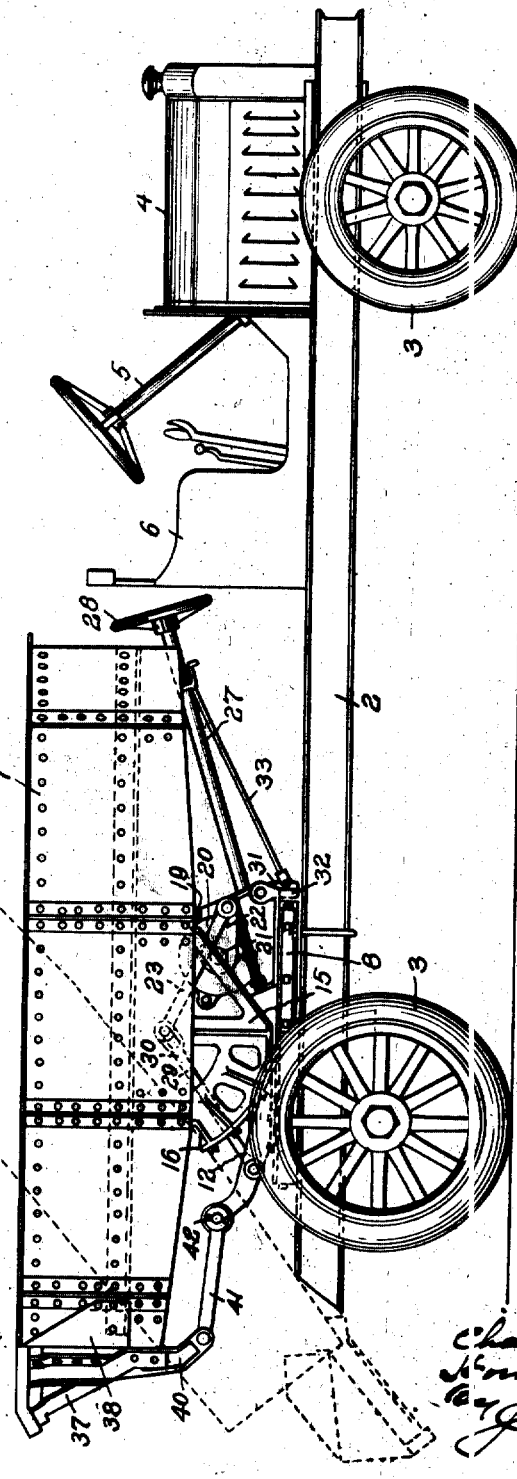

UNITED STATES PATENT OFFICE.

CHARLES H. CLARK, OF CRAFTON, AND HOWARD L. BEACH, OF EDGEWOOD, PENNSYLVANIA.

DUMP-TRUCK.

1,220,727.  Specification of Letters Patent.  Patented Mar. 27, 1917.

Application filed February 27, 1915. Serial No. 10,934.

*To all whom it may concern:*

Be it known that we, CHARLES H. CLARK and HOWARD L. BEACH, citizens of the United States, and residents of Crafton and Edgewood, respectively, in the county of Allegheny and State of Pennsylvania, have invented certain new and useful Improvements in Dump-Trucks, of which the following is a specification.
The primary object of this invention is to provide a motor-propelled dump truck of simple construction adapted to be easily and conveniently operated for dumping the load at the rear or at either side of the truck, the dumping mechanism being movable to position for dumping along with the truck body and being equally effective in all positions.

The invention includes rocker supports for the body of improved construction, together with improved means for sustaining the body in normal or upright position. Provision is also had for holding the body upright and against displacement in any direction.
A further object is to provide the dumping body with a highly efficient end gate, together with improved means for causing the movements of the body toward and from dumping position to automatically open and close the gate, the gate when open constituting a chute for directing the discharging load. The arrangement is such that the movements of the gate are automatically controlled in all positions in which the body may be placed for dumping, whether at the rear or at either side.

It is further characteristic of the invention that the body and body dumping mechanism may be applied to various makes of motor-truck chassis, thereby eliminating the necessity of providing a truck frame of special design.

In the accompanying drawings, Figure 1 is a side elevation of a truck embodying the invention, the body being shown in normal position in full lines and in dumping position in dotted lines. Fig. 2 is a top plan of the truck with the body shown in the normal or full line position of Fig. 1, and with portions of the body floor broken away to disclose the operating mechanism located therebeneath. Fig. 3 is a longitudinal section of the body and its mounting, illustrating the position thereof when the body is dumping at one side of the truck or at right angles to the position shown in Fig. 1.

Referring to the drawings, the truck chassis is of conventional form, consisting of the longitudinal frame-forming side girders 2, ground wheels 3, engine 4, steering post 5, and operator's seat 6, the engine and associated parts being located toward the forward end of the frame and out of the way of the body and body operating mechanism located at the rear. The chassis is typical of many makes for truck use now on the market.

The rotatable mounting for truck body 7, whereby it may dump at the rear or at either side, consists of a conventional form of turn-table 8 having its fixed end portion 9 secured to girders 2 and with roller bearings 10 of usual and well known construction interposed between turn-table parts 8 and 9 so that part 8 may turn freely about its axis 11. Secured to the upper side of table 8 are separated parallel rocker trackways 12, the inner ends of which terminate in a line which approximately intersects axis 11, the trackways being preferably inclined upwardly from their ends to oppose the rocker movement when the body is moving toward dumping position.

Body 7 is preferably fabricated from steel plates and shapes including transverse floor sills 13, and secured between these sills and immediately beneath floor 14 are the rocker frames 15. Each of these frames has at its under side a rocker forming segmental portion 16 and a flat floor-supporting top portion 17, also vertical side portions 18 which are secured to sills 13. Trackways 12 and rockers 16 are provided with interfitting projections and depressions to provide the usual cog-like connections for preventing shifting of the rockers. The rockers are preferably so disposed with relation to the loaded body that the weight tends to hold the body in upright position. While the center of gravity shifts as the body rocks in dumping, the upward inclination of the rocker trackways counteracts this tendency in such manner as to relieve the dumping movement of surging tendency.

When the body is in upright position, as in Fig. 1, the rocker frames 15 comprise upright parallel supports therefor which are in line with each other transversely of the body, while a third and forwardly positioned support is provided by lug 19 on gear casing 20, the forward floor sill 13 resting on said lug when the body is in normal position. Thus, the body is positively supported on turn-table 8 at three points, and these supports taken in connection with the means hereinafter described for resisting movement either backwardly or forwardly from normal position results in holding the body absolutely immovable until released for dumping.

The dumping gear is mounted on turntable 8 and includes the gear casing 20 in which is journaled shaft 21 having cranks 22 which are connected by links 23 with transverse rod 24 secured to rocker frames 15. A gear wheel 25 on shaft 21 and inclosed by casing 20 meshes with worm 26 on operating shaft 27, the latter journaled in the gear casing and extending forwardly beyond the front end of body 7 when the latter is in normal position, the extremity of the shaft carrying hand wheel 28. With the body in normal position as in Fig. 1 the worm gearing comprises a lock against backward or tilting movement of the body, while abnormal forwardly tilting movement thereof, such as might result from loading the body more heavily at its front end than at its rear, is precluded by links 29 having their outer ends secured to trackways 12 and their inner and upper ends 30 secured to rod 24 and slotted as shown to afford the movement necessary for the dumping operation. Thus it will be seen that the body when in normal position is securely held against displacement in any direction. A gravity latch 31 hinged to turn-table 8 is adapted to engage lugs 32 located at the front and at either side of the fixed table base 9 for locking the turn-table with the body turned in position for dumping at the rear or at either side. The latch may be released by rod 33 which extends toward and is within easy reach of hand-wheel 28. Even with the body fully loaded it may be readily rotated by means of the turn-table, the operator simply releasing the latch and pushing or pulling the body around to discharge its load at one side or the other of the truck.

The end gate 34 is mounted to turn outwardly and downwardly on hinges 35, the latter mounted in the rear end of the body frame beneath floor 14. The gate is of chute-like form, being inclined upwardly and outwardly from its lower edge with a central panel-like portion 36 and two diagonally disposed sloping panel-like side portions 37, and projecting from each of the latter are the wall-forming wings 38 which overlap the side walls of the body when the gate is closed. The gate opens outwardly and downwardly and when in open position panels 37 deflect and concentrate the discharging load on central panel 36, thereby forming a relatively narrow stream for discharging into a coal hole, or for contracting the discharging load of coal, sand, gravel or other commodity into a relatively small space.

For automatically opening and closing the end gate in any and all dumping positions of the body, whether at the rear or at either side, arms 40 depending from the gate beneath hinges 35 are connected by links 41 to a non-dumping portion of the structure, preferably to the extremities of trackways 12, as indicated at 42. The downwardly tilting movement of the body so increases the distance between hinges 35 and points 42 that the gate is swung outwardly and downwardly, as in Fig. 3, into the chute-forming position above described, and is positively held in that position as long as the body remains tilted. The righting movement of the body results in automatically restoring the gate to closed position in which it is securely held by links 41 so long as the body remains upright.

The improved truck is adapted for all services in which a dumping vehicle may be used. And while its facility for dumping either at the rear or at either side renders it peculiarly well adapted for coal haulage, it will be understood that sand, gravel and other materials capable of dumping may be transported and dumped with equal facility. There is ample clearance for dumping at either side without interferring with the ground wheels. When in lowered or dumping position the chute-forming end gate is relatively close to the ground or pavement, and at the same time is spaced well outwardly from the ground wheels so that the load is discharged clear of the running gear and has no tendency to flow back beneath the truck, an objection commonly experienced with dumping vehicles. While the improved truck is designed primarily for motor use, the invention is not limited thereto.

The end gate and gate actuating means are claimed in our application filed January 6, 1916, Serial No. 70,601.

We claim:—

1. A dump truck comprising a truck wheel supported frame, trackways carried thereby, a tilting body supported in an elevated position by and provided with depending rockers traveling on said trackways as the body tilts to and from upright and dumping positions, upwardly and forwardly inclined links at their lower ends pivotally coupled to said frame and at their upper ends having longitudinal slots receiving pivots fixed to the body at the central portion thereof and arranged to limit dumping movement and abnormal forward tilting of the body, and means for tilting the body.

2. A dump truck comprising a truck wheel supported frame, trackways carried thereby, a tilting body provided with supporting rockers traveling on said trackways as the body tilts to and from upright and dumping positions, said rockers depending from the central portion of the body, upwardly and forwardly inclined links at their lower rear ends pivotally coupled to the frame and at their upper front ends pivotally joined to the central portion of the body and arranged to limit dumping and forward tilting movements of the body and to aid in holding the rockers down on the trackways when the body is locked in upright position, and means for tilting the body and to aid said links in locking the body and its rockers against vertical movement from said trackways when the body is in upright position.

3. A dump truck comprising a truck frame, a turn table supported thereby and rotatable on a vertical axis, separated parallel rocker trackways on said turn table, a tilting truck body, separated parallel depending rockers secured to the body approximately midway its length and fitting the trackways and constituting two central supports for and on which the body is approximately balanced, an advanced central body support on said turn table, means for exerting forward and downward pull on the body to tightly draw and lock the rockers down on the trackways when the body is in normal upright position, said means embodying body tilting mechanism, and means pivotally joining the rear portion of the turntable and the body to resist abnormal forward tilting of the body and to be tightened by said forward and downward pull.

4. In a dump truck, in combination, a truck frame, spaced parallel trackways thereon, a transverse crank shaft provided with actuating means, a tilting body provided with central depending rockers adapted to travel on said trackways and on which the body is approximately balanced, a transverse rod extending between and secured to the upper portions of said rockers, an upwardly and forwardly extending slotted stop link at its upper forward end pivotally joined to said rod and at its lower rear end pivotally coupled to the frame, and a body tilting and locking link pivotally connecting the crank shaft and said rod.

5. In a dump truck, the combination of a truck frame, a trackway supported thereby, a tilting truck body, a rocker fixed to and depending from the central portion of said body and fitting said trackway, a holding device coupled to the central portion of said body and with said frame to resist abnormal forward tilting of the body when in normal upright position and also to resist abnormal dumping movement of the body and to aid in locking the rocker down on the trackway when the body is in upright position, and body tilting mechanism carried by the frame and coupled to the body approximately over said rocker and arranged to exert downward pull on the rocker when the body is in upright position to tighten said holding device and to aid in preventing upward movement of the rocker from the trackway.

6. In combination, in a dump truck, a supporting frame, a turntable carried thereby and rotatable on a vertical axis, a dumping body mounted on and carried by said turntable, said body being approximately balanced when supported on said table in normal upright position, said turntable provided with a stop to engage the central portion of the body bottom when the body is in upright position, means to prevent abnormal forward tilting of the body when engaging said stop, and body tilting and locking mechanism comprising a transverse crank shaft carried by the turntable and provided with lock gear actuating means and a pitman from said crank shaft and pivotally joined to the central portion of the body and in rear of said stop, substantially as described.

7. In combination, in a dump truck, a supporting frame having trackways, a dumping body having longitudinally-arranged rockers depending from its central portion, said body being approximately balanced on said rockers, said rockers traveling longitudinally on said trackways as the body tilts to and from upright and dumping positions, means to hold said body against abnormal forward tilting beyond upright position and from lifting from said trackway when in upright adjustment, and body tilting and locking mechanism comprising a transverse crank shaft carried by the frame and provided with lock gear actuating means and a body controlling and tilting pitman pivotally connecting said shaft and the portion of the body above the rockers and arranged longitudinally thereof in the general direction of the travel of the rockers on the trackways as the body moves to and from dumping position, whereby said pitman extends rearwardly from the crank shaft to its point of attachment with the body when the body is in upright and all other positions in its range of movement.

8. In combination, in a dump truck, a supporting frame, a turntable thereon rotatable on a vertical axis, a dumping body approximately balanced and mounted on said table, a fixed upright gear case on said table and located approximately under the central portion of said body and forming a rest, a transverse crank shaft mounted in said case and provided with a worm gear, a shaft mounted in and carried by said case and provided with a worm for actuating said gear, said shaft extending forwardly longitudinally of and below said body and above the table and frame and in advance of the front end of the body provided with an operating handle, and a body tilting and controlling pitman coupling said crank shaft and body together, substantially as described.

9. In combination, in a dump truck, a supporting frame, truck wheels, a turntable supported on the frame and rotatable on a vertical axis, trackways on the table having approximately horizontal front portions and upwardly inclined elevated rear end portions, a dumping body overhanging said truck wheels and having central depending rockers on which the body is approximately balanced, said rockers normally resting on the horizontal portions of said trackways and traveling longitudinally of the trackways as the body tilts to and from dumping and elevated positions, said rockers traveling up the rear ends of said ways to lift the body clear of said wheels as the body completes its dumping movement, said rockers traveling down said inclined ends of the ways to facilitate the return movement of the body, and body dumping and controlling mechanism between the table and body.

In testimony whereof we affix our signatures in presence of two witnesses.

CHARLES H. CLARK.
HOWARD L. BEACH.

Witnesses:
M. J. FENDNER,
M. S. STAVER.